Jan. 14, 1969  W. H. YEAMANS  3,422,319
BONDED COMPOSITE END PLUG SEAL FOR ELECTROLYTIC CAPACITORS
Filed March 21, 1966
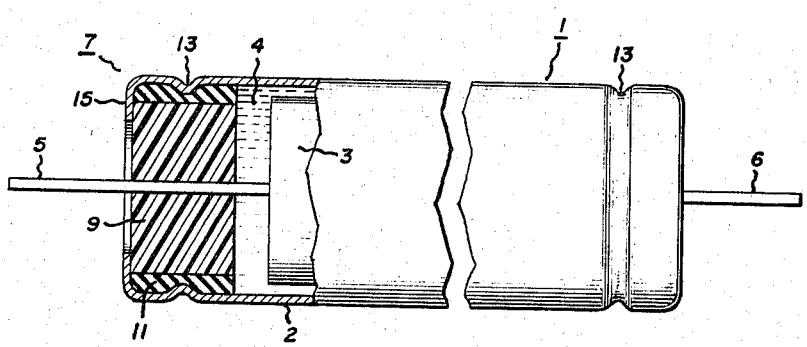
INVENTOR:
WILFRED H. YEAMANS,
BY  Henry T. Olsen
HIS ATTORNEY.

United States Patent Office 3,422,319
Patented Jan. 14, 1969

3,422,319
BONDED COMPOSITE END PLUG SEAL
FOR ELECTROLYTIC CAPACITORS
Wilfred H. Yeamans, Seabrook, Tex., assignor to General
Electric Company, a corporation of New York
Filed Mar. 21, 1966, Ser. No. 536,043
U.S. Cl. 317—230  5 Claims
Int. Cl. H01g 9/00

ABSTRACT OF THE DISCLOSURE

An electrolytic capacitor end plug seal is disclosed which includes a central plug having an etch bonded layer or coating of an elastomer thereon which is engaged by a crimped portion of the capacitor can. Teflon and Viton materials are also disclosed for the plug and layer.

---

The present invention relates to electrical capacitors and more particularly to such capacitors having seal assemblies.

A frequent cause of failure of electrolytic capacitors is the loss of electrolyte through inadequate seals provided for the capacitor case. Such loss leads to variation and degradation of the electrical properties of the unit, as well as premature breakdown. Prior seal structures used for electrolytic capacitors have not in general provided entirely satisfactory results for various reasons. For example, certain of the prior seal structures have not adequately prevented escape of the electrolyte liquid or vapor emanating therefrom, while in those cases where such escape was effectively prevented, the buildup of vapor or gas pressure within the unit often resulted in ejection of the end seal.

It is an object of the invention to provide a seal structure for electrical devices, especially electrolytic capacitors and the like, which provides an effective and long-lasting seal and avoids the disadvantages of the prior art structures of this type.

It is another object of the invention to provide a seal structure of the above type which is characterized by a strong, electrically insulating, hermetic or fluid-tight seal preventing escape of the contained liquid or vapor, electrolyte resistant, which has high mechanical strength to resist internal pressure, which forms an effective vapor barrier, and which is economically and readily produced.

Prior seal structures have used an end cap or plug composed of polytetrafluoroethylene with good results but still subject to the aforementioned difficulties. It is a further object of this invention to provide an improved polytetrafluoroethylene seal assembly for electrolytic capacitors.

A still further object of the invention is to provide an electrical capacitor having an improved polytetrafluoroethylene seal assembly.

In accordance with the invention there is provided an end plug for an electrolytic capacitor composed of polytetrafluoroethylene having an elastomer intimately bonded on its surface and a method for producing the same. Further, there is provided an electrolytic capacitor comprising a casing having an open end, a capacitor section within the casing, a terminal lead extending from the capacitor section through the open end and a seal assembly hermetically closing the open end of the capacitor casing and electrically insulating the lead from the casing, said seal assembly comprising a cylindrical end plug composed of polytetrafluoroethylene having an elastomer coating intimately bonded thereto and a crimped portion of said casing tightly engaging said elastomer.

Further objects and advantages of the invention will be understood as the following complete description proceeds and from the drawing wherein the single figure is a view of a capacitor embodying the invention, certain parts being broken away to show the interior.

Referring now to the drawing, there is shown an electrolytic capacitor 1 comprising a casing 2 preferably made of a metal such as aluminum and containing a rolled capacitor section 3, conventionally made of a pair of convolutely wound, film-forming metal electrode foils separated by paper or other dielectric spacer material, and liquid electrolyte 4 which fills the casing and impregnates capacitor section 3. Electrolyte 4 may be of any conventional or known type of capacitor electrolyte, as, for example, an aqueous ammonium pentaborateglycol solution and it may be of liquid, gel, paste or other form. Terminal leads 5 and 6 are connected to the respective foils and extend outwardly from opposite ends of casing 2, the terminals and the foils to which they are respectively connected having opposite polarity in the operation of the capacitor unit. Leads 5 and 6 may be of film-forming metal and may have welded thereto outer lead members (not shown). In a usual construction casing 2 is tubular with opposite open ends, each end being fluid-tightly sealed by a seal assembly 7 having the structure, composition and arrangement provided in accordance with the invention, as more fully described herein. While the seal structure of only one end of the capacitor casing is shown and described in connection with each figure, it will be understood that the opposite open end may have the same seal structure therein.

It should also be understood that the described seal structures of this invention could be employed in types of capacitors other than those shown. For example, casing 2 could be of cup-shaped form with an anode of suitable type (such as a sintered slug or wound foil anode) inserted therein instead of capacitor section 3, the casing serving as the cathode and having terminal 6 soldered to its bottom end, all as well known in the art. While the electrodes have been referred to as having a certain polarity, the invention may also find application in nonpolarized capacitors.

In accordance with the invention, a novel end seal structure 7 forms the closure for the open end of capacitor casing 2 to retain the electrolyte 4 therein, and provide therefor a strong, fluid-tight seal both around the interior surface of the casing and around the terminal lead 5 which passes therethrough, while electrically insulating terminal lead 5 from casing 2.

The seal assembly comprises a cylindrical end plug or cover 9 through which the lead 5 extends in a hermetic seal. The end plug 9 is coated with an elastomer layer 11, which layer is intimately bonded thereto. A crimped portion 13 of the casing 2 tightly engages the elastomer and forms a hermetic seal therebetween. Preferably, a rolled end portion 15 of the casing surrounds the plug 9 and provides additional support against axial pressures.

The end plug 9 is composed of polytetrafluoroethylene, known by the trademark "Teflon," since this material is highly resistant to severe chemical and thermal conditions. The coating material forming the elastomer layer 11 must be similarly chemically and thermally resistant while having a higher degree of resilience and being intimately bondable to the polytetrafluoroethylene. The elastomer layer 11 is therefore preferably a fluoroelastomer synthetic rubber known as "Viton," which is a synthetic rubber composed of a blend of hexafluoropropylene and vinylidene fluoride.

The end plug 9 is formed by first thoroughly cleaning the surface of a polytetrafluoroethylene rod, for example, with alcohol, to remove any films or foreign substances, the rod having a diameter approximately the desired dimension of the end plug 9. This surface is then etched by placing the rod in a suitable etchant, such as, sodium napthanate of a period of time sufficient to permit the etchant to react with the polymer. This time period is usually between 10 and 30 seconds at room temperature, but can be shortened by heating the etchant to a higher temperature if desired. The etchant is thoroughly removed from the rod by rinsing with tricholoroethylene and alcohol. The rod is then dipped in a liquid mixture of 20 parts Viton, and 1 part accelerator such as an amine, in a suitable solvent such as a ketone or amyl acetate. The coated rod is then baked at approximately 125° C. for approximately 30 minutes to hermetically bond the coating on the rod. The rod is then cut into a plurality of suitably dimensioned end plugs 9.

While the coating process has been described with reference to the preferred practice thereof, it will be appreciated that a rod could be first cut to the proper length for the plug and then treated, or the coating could be effected on a continuous basis ancillary to the extrusion of the rod.

In a typical method of assembly the seal structure such as shown in the figure, the lead wire 5 is provided with a sharp point and it is then spun or pushed through the plug member 9, the elastic characteristic of the plug material causing it to closely conform to the lead wire and form a hermetic seal therewith. The parts are assembled within the casing and the case crimped in region 13 and rolled at the rim 15 as shown to secure the parts in tight assembly. As somewhat diagrammatically shown in the drawing, the resiliency of the elastomer permits the crimp region 13 to form a large area of contact therewith, thereby providing a hermetic seal.

There is thus provided by the invention a seal structure which provides excellent retention of the fill electrolyte of the capacitor over long periods of time and thus significantly contributes to maintaining the electrical properties of the capacitor substantially constant. In this way, the invention makes possible electrolytic capacitors of extremely high reliability, even over a wide temperature range of —55° C. to 125° C. and higher.

Although the invention has been described principally with respect to electrolytic capacitors, it will be evident that the described seal structure may have application to other electrical devices where maintenance of a strong fluid-tight seal for the container of the electrical device is of importance.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed as new and desired to be secured by Letters Patent of the United States is:

1. An electrical capacitor comprising a casing having an open end and containing therein an electrolyte and a capacitor section immersed in said electrolyte, a terminal lead extending outwardly from said capacitor section through said open end, and a seal assembly hermetically closing the open end of the capacitor casing and electrically insulating the terminal lead from said casing, said seal assembly comprising an end plug composed of polytetrafluoroethylene having a cured elastomeric coating intimately etch bonded thereabout and a crimped portion of said casing tightly engaging said elastomeric coating.

2. An electrical capacitor as recited in claim 1 wherein said coating is composed of fluoroelastomer.

3. An electrical capacitor as recited in claim 2 wherein said coating is composed of a blend of hexafluoropropylene and vinylidene fluoride.

4. The invention as recited in claim 1 wherein said coating and said end plug comprise concentric coextensive cylindrical members.

5. The invention as recited in claim 3 wherein said crimped portion projects into said layer and is spaced from the cylindrical wall of said end plug.

References Cited
UNITED STATES PATENTS

| | | | |
|---|---|---|---|
| 3,056,072 | 9/1962 | Schroeder et al. | 317—230 |
| 3,335,335 | 8/1967 | Perkins | 317—230 |

JAMES D. KALLAM, *Primary Examiner.*

U.S. Cl. X.R.

174—52; 317—242